(12) United States Patent
Keskilohko

(10) Patent No.: US 6,266,921 B1
(45) Date of Patent: Jul. 31, 2001

(54) CELL AND CELL TRAY FOR GROWING SEEDLINGS

(75) Inventor: Altti Keskilohko, Säkylä (FI)

(73) Assignee: Lannen Tehtaat Oyj, Iso-Vimma (FI)

( * ) Notice: Subject to any disclaimer, the term of this patent is extended or adjusted under 35 U.S.C. 154(b) by 0 days.

(21) Appl. No.: 09/363,109

(22) Filed: Jul. 30, 1999

(30) Foreign Application Priority Data

Jul. 31, 1998 (FI) .......................................... 981684

(51) Int. Cl.⁷ .......................................... A01G 9/10
(52) U.S. Cl. .......................................... 47/86; 47/87
(58) Field of Search .......................................... 47/86, 87

(56) References Cited

U.S. PATENT DOCUMENTS

| | | | |
|---|---|---|---|
| D. 322,048 | 12/1991 | Saarinen . | |
| D. 325,714 | 4/1992 | Karhiniemi et al. . | |
| D. 401,530 | 11/1998 | Keskilohko . | |
| 3,931,694 | * 1/1976 | Krikorian | 47/86 |
| 4,111,585 | * 9/1978 | Mascaro | 47/86 |
| 4,118,892 | * 10/1978 | Nakamura et al. | 47/86 |
| 4,389,814 | * 6/1983 | Andreason et al. | 47/87 |
| 4,442,628 | 4/1984 | Whitcomb . | |
| 4,497,132 | 2/1985 | Whitcomb . | |
| 4,510,712 | 4/1985 | Whitcomb . | |
| 4,716,680 | 1/1988 | Whitcomb et al. . | |
| 5,241,784 | 9/1993 | Henry . | |

FOREIGN PATENT DOCUMENTS

| | | | |
|---|---|---|---|
| 71650 | 10/1986 | (FI) . | |
| 8001210-7 | 10/1981 | (SE) . | |
| WO93/19583 | * 10/1993 | (WO) | 47/86 |

* cited by examiner

Primary Examiner—Peter M. Poon
Assistant Examiner—Jeffrey L. Gellner
(74) Attorney, Agent, or Firm—Burns Doane Swecker & Mathis L.L.P.

(57) ABSTRACT

Cultivation cell for seedlings and a tray formed from such cells, comprising apertures breaking the cell upper rims. Thereby growth disturbancies in roots growing close to the substrate surface are prevented. The tray comprises air channels, and growth of surface roots across the upper apertures from one cell to another is prevented by structural elements giving the tray rigidity.

1 Claim, 4 Drawing Sheets

CELL AND CELL TRAY FOR GROWING SEEDLINGS

FIELD OF THE INVENTION

The invention relates to the cells or containers for growing seedlings in nurseries or greenhouses. More specifically, the invention relates to seedling cells having openings and designed for cultivation of seedlings, whereby the development of root growth deformations due to the cell walls is avoided.

BACKGROUND OF THE INVENTION

Seedlings for transplanting purposes have long been grown in various types of containers. Depending on the species and its intended use, the method provides various advantages. The containers, or cells, can be combined to form trays of sizes appropriate for each individual species to be processed. A good cultivation tray, particularly one that is intended for forestry purposes, should possess good handling properties in different processing stages, good growing properties like correct size of lump, good oxygen supply for the roots, good lump release properties, and should provide for draining of excess water.

Particularly in the cultivation of woody species, problems may occur by cell cultivation. A root emerging from a growing seedling or cutting tends to grow radially outwards toward the cell wall. As the root reaches the curved cell wall, it will follow the wall continuing its linear growth, growing in a descending spiral until the cell bottom is reached, whereby the root may further continue its circular growth. This results in a root system which may be harmful to the plant after transplanting. The roots do not provide good structural support; the spiralling roots tend to grow downwards to set at a depth where oxygen supply is insufficient. The intertwined roots also impair the flow of nutrients, as they increase in thickness.

Numerous methods have been devised to restrain root spiralling. Cell walls may be impregnated with a chemical compound that stops root growth as the root tip reaches the cell wall, as disclosed in, e.g. Finnish Patent 71650. This method is feasible, e.g. in single use flexible cell systems made of paper or the like. When rigid materials, e.g. plastics are used, one possibility is to design undulating cell walls, providing pockets to intercept the root tips, whereby these stop growing. Such solutions are disclosed in, e.g. U.S. Pat. Nos. 4,716,680 and 4,442,628.

Root growth is halted also when the root tip meets free air space, which phenomenon is known as air pruning. Thus, cells having side wall apertures of various shapes and sizes have been developed. For example, in Swedish Patent 8001210-7 a cell tray is disclosed where the cells comprise an upper framework and ribs protruding downwards therefrom, the ribs being sufficiently rigid to retain the lump of growth medium. Openings or slits can be combined with other structural features of the cell wall to direct roots toward the openings, as disclosed in e.g. U.S. Pat. Nos. 4,497,132, 4,510,712 and 5,241,784.

When the linear growth of a root is halted, branching of the root commences. It has been observed that following transplanting, development mainly takes place in the roots that have already been formed in the cell cultivation stage. Thus, the number and distribution of root tips are crucial for the success of a transplanted seedling.

For the development of several plants, in particular northern coniferous wood species, it is essential that roots growing close to the ground surface develop well. Near the surface supply of oxygen and nutrients is abundant, and for small seedlings it is deleterious that the root systems develops at too deep a level, where the soil is cold.

It is a common feature of all prior art nursery cells that the upper edge of the cell is unbroken, which is an obvious solution from a structural point of view. However, it has been observed that root spiralling can occur also very close to the lump surface. As water is supplied from above, surface roots develop. Even a narrow rim section of a cell, being 5–10 mm high, may induce spiralling of surface roots. A surface root growing into an obstacle may turn to grow vertically into a so-called "knee root", whose tip sets too deep for being useful for the plant; or the root may grow over the cell edge into an adjacent cell, which makes subsequent handling of the seedling more difficult, as well as impairs its later development.

U.S. Pat. No. 4,510,712 discloses a cell tray having slits reaching close to the upper frame-work. However, said upper framework forms an unbroken top surface on the tray. A prerequisite for efficient air pruning is sufficient venting between cells in a tray. Therefore, air pruning trays are provided with vertical air channels at least in the junctions between cells, as disclosed in e.g. U.S. Design Nos. 322,048, 325,714 and 401,530.

SUMMARY OF THE INVENTION

A cultivation cell for plants has been invented, wherein the coiling of surface roots is prevented by providing apertures or slits reaching the upper edge of said cell. The air slits for inducing air pruning in the upper part of the cell are located so as to break the upper edge or rim of the cell.

According to another embodiment of the invention, cells having air pruning apertures resulting in discontinuous upper rims are combined to form cell trays, whereby the apertures breaking the upper rims open into channels providing for undisturbed vertical air currents between the cells.

According to a further embodiment of the invention, said channels are provided with structural elements dividing the channels into sections, thereby effectively preventing root growth from one cell to adjacent cells, simultaneously giving the tray structure increased rigidity.

As there is no unbroken structure linking together the cell upper circumference, as is the case in prior art cells and trays for air pruning, the risk for deformation of the important root system in the surface layer of the lump of growth medium is significantly smaller than using prior art cells or trays. Side wall apertures which have no upper bridging structure also make substantially easier the extraction of lumps from the cells, as root tips that have grown out of the apertures can leave freely. The more open structure, with better aeration, also provides for better germination and growth conditions in the cultivation medium. The locations of the apertures and the design of the bridging structures between them are so chosen, that also downward-growing roots are most likely to encounter an aperture, whereby air pruning takes place effectively.

According to the present invention, single cells having the above described apertures breaking the cell upper rim, may be combined into arrays of cells, or trays. The trays comprise channels allowing effective vertical air flow between cells, to which channels the apertures open. The channels must be sufficiently wide not to be too easily clogged by growth medium, like peat. Preferably, channels have dimensions larger than about 5 mm.

According to embodiment of the invention, said air channels are subdivided by means of structural elements of a desired height, preferably forming vertical wall structures, e.g. ribs having a cross-like horizontal section. These have a dual function. On the one hand, they prevent surface roots from growing across the air channel into an adjacent cell, and on the other hand they provide strength to the tray, making it more manageable during handling. As the cell upper rims are discontinuous according to the invention, the tray may become less rigid than a prior art tray with continuous upper rims, if said structural elements are not used.

A cell or a cell tray according to the invention may be manufactured from a suitable material known to the person skilled in the art. Preferably, cells as well as trays are manufactured in one piece by injection moulding from a thermoplastic polymer like polyethylene, polypropylene or polystyrene. Single cells may also be joined together by e.g. glueing or welding.

DETAILED DESCRIPTION

Figure 1:
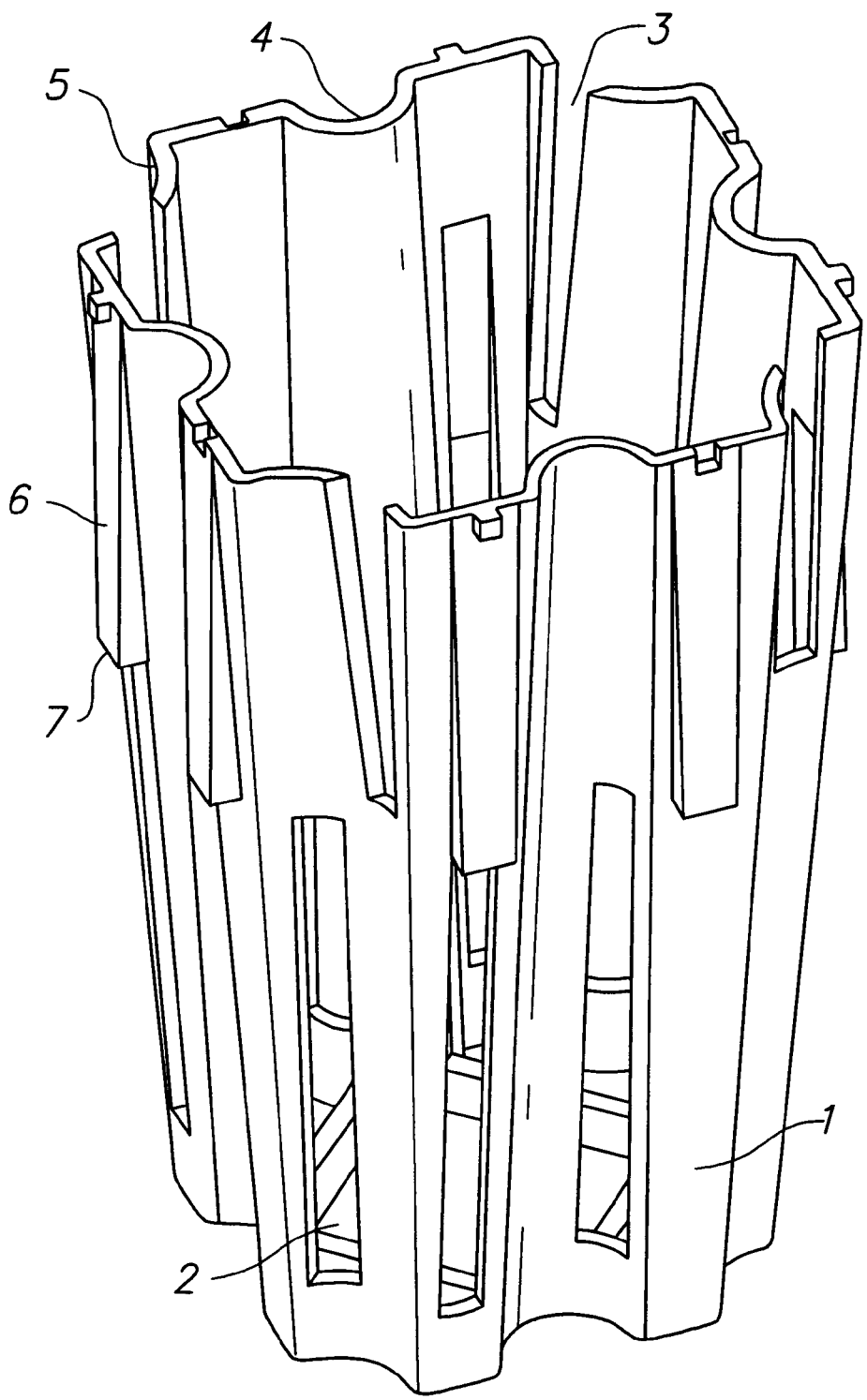
FIG. 1 represents a perspective view of a single cultivation cell according to the present invention.

The unit cell shown in FIG. 1 comprises walls 1 and in the lower part thereof lower apertures 2, and in the upper part thereof upper apertures 3, reaching and breaking the upper rim of the cell. In a cell according to the present invention, the lower apertures 2 may reach the level of the lower edge of the upper apertures or higher, whereby the tip of a root circling in a horizontal plane always encounters an aperture at some stage. In the sides and corners of the cell, inwardly curved sections 4 and 5 are provided for directing roots toward the apertures. In the embodiment shown, on the outer walls of the cell are vertical structural ribs 6 forming stops 7, enabling the stacking of cells or of trays formed thereof without the units getting stuck, as the stops 7 come to rest on the edges of a lower unit, the edges being unbroken at the relevant locations. The cell as a whole is slightly tapered, to facilitate the release of a lump.

Figure 2:
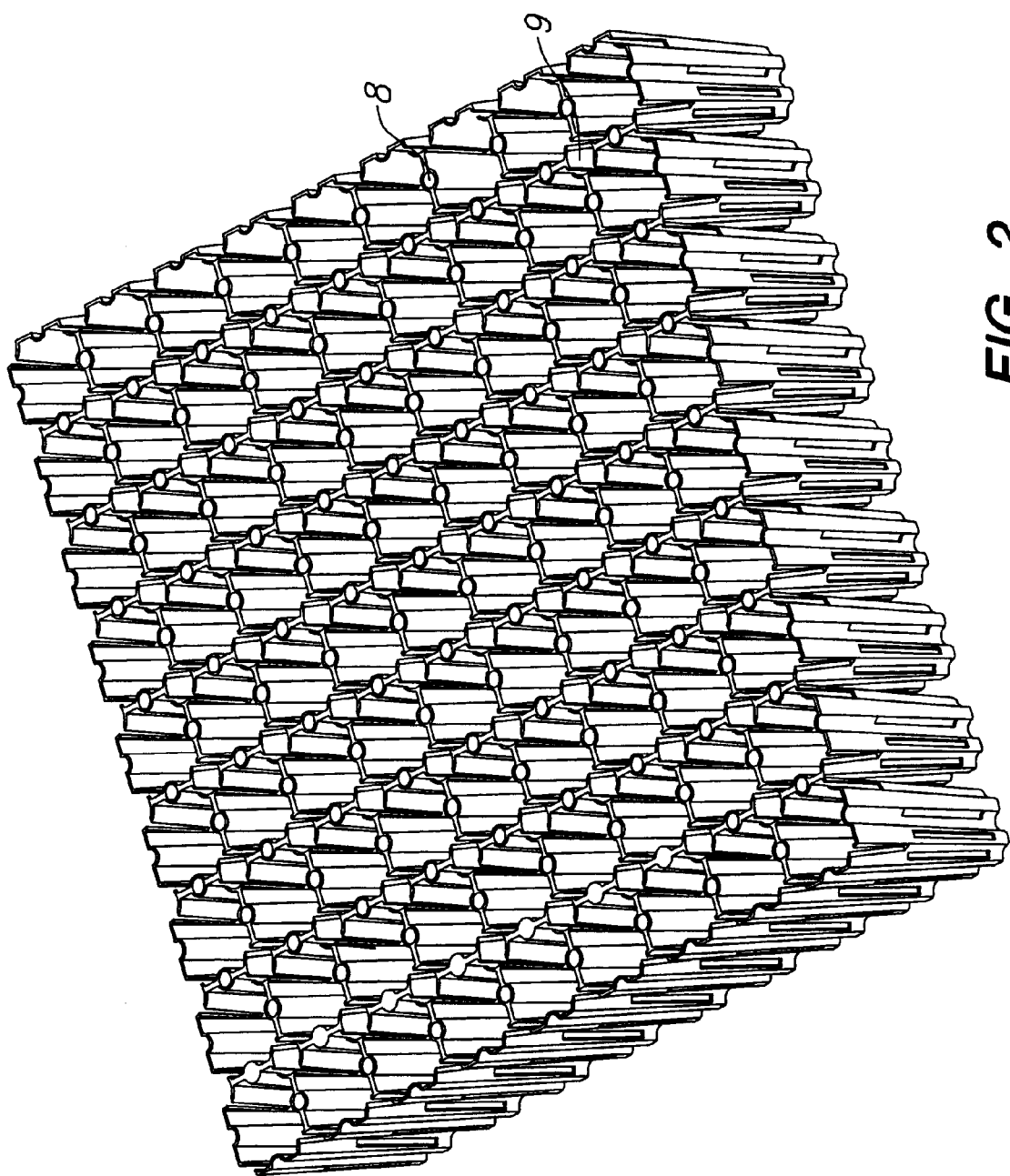
FIG. 2 represents a perspective view of a cell tray comprised of cells according to FIG. 1.

FIG. 2 shows a cell tray from the combination of cells of the type shown in FIG. 1, with air channels 8, 9 formed from the curved sections 4, 5.

Figure 3:
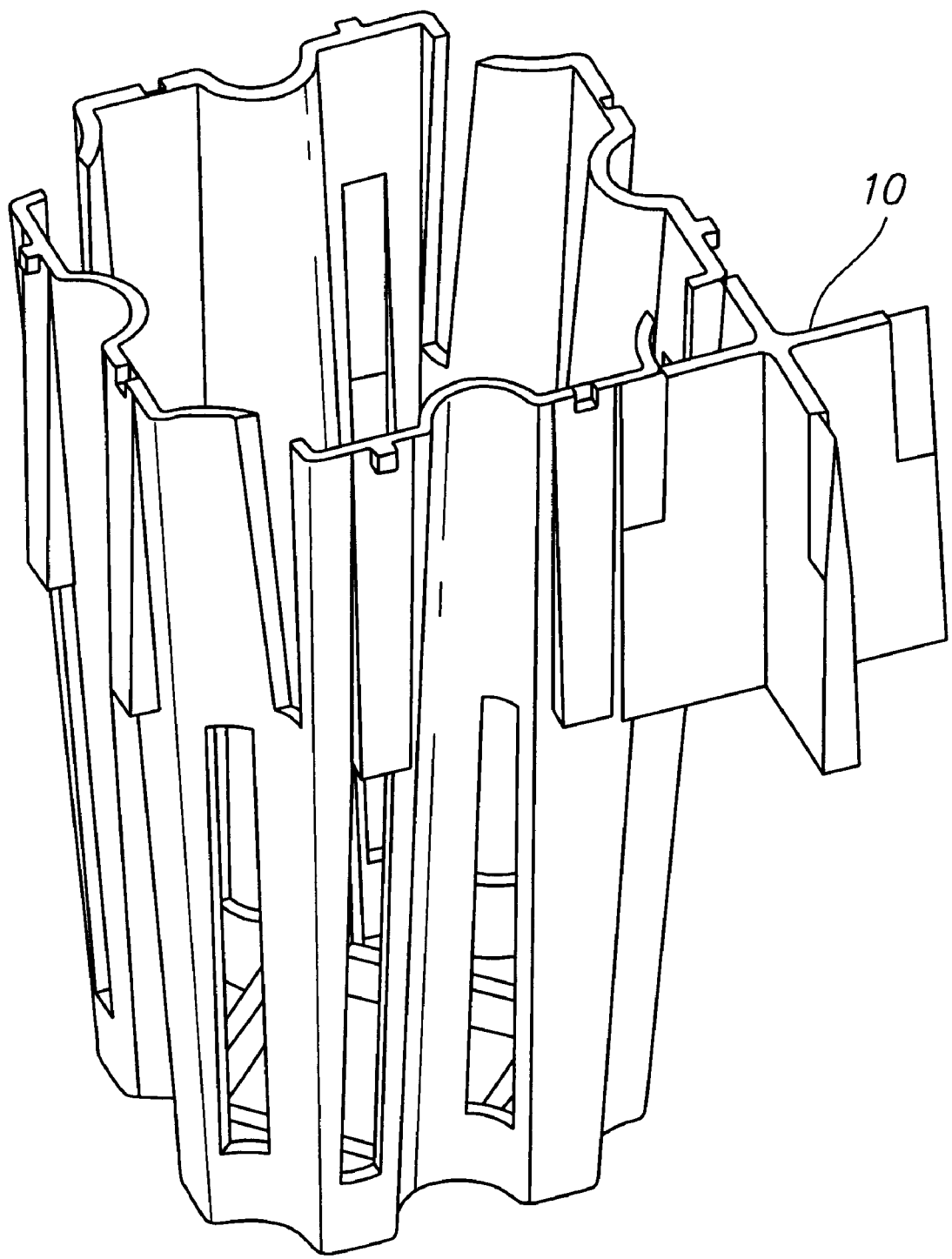
FIG. 3 represents a perspective view of a single cell according to the invention, having a cross-rib structural element attached in one corner.
Figure 4:
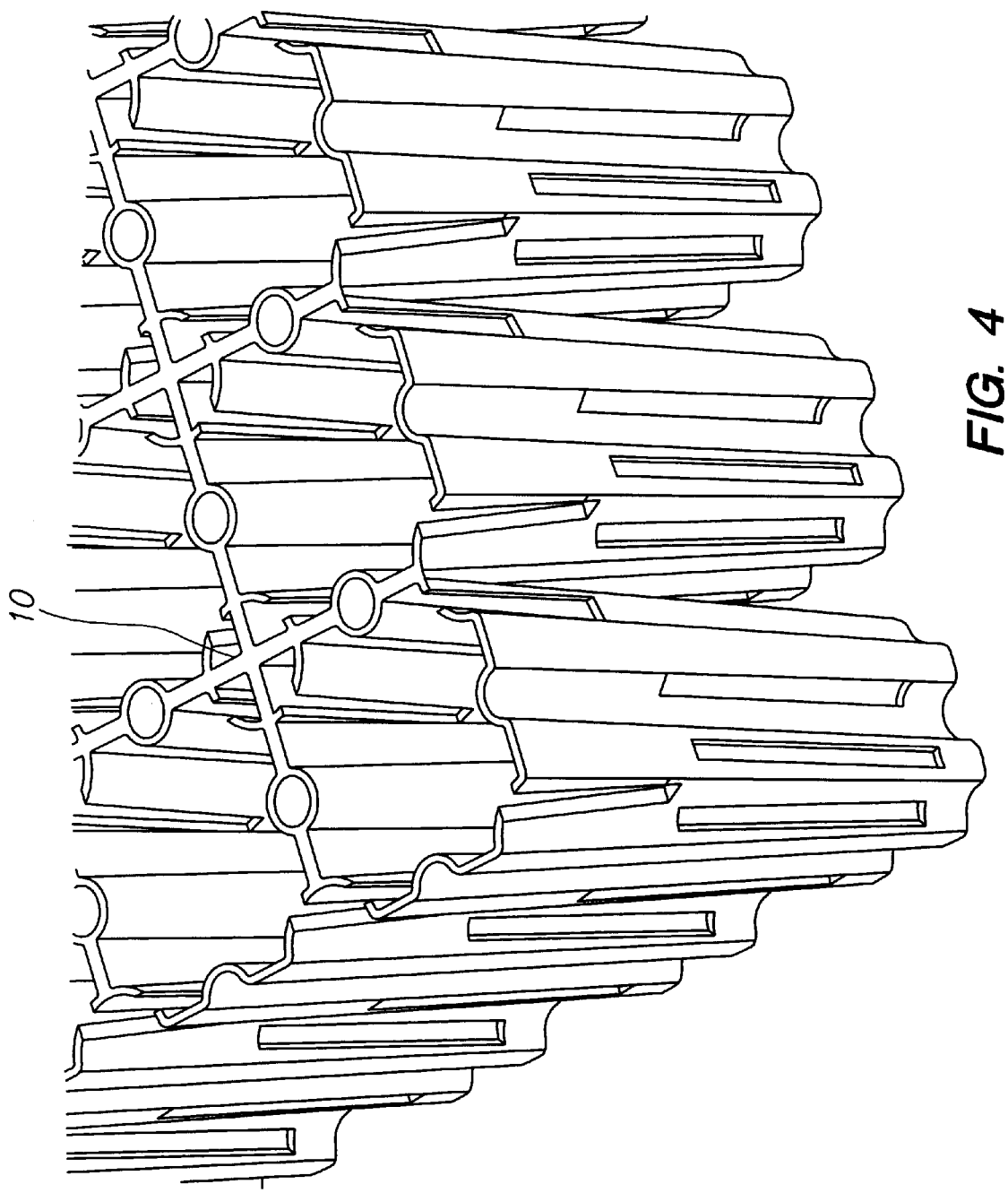
FIG. 4 represents an enlarged perspective view of a cell tray comprised of cells according to FIG. 3, having cross-rib structural elements in the air channels formed at the intersections between cells.

The corner air channels 9 can be provided with cross rib elements 10 according to FIG. 3. When a tray of desired size is formed from such units, the cross rib prevents roots from growing across channels 9 into adjacent cells. FIG. 4 shows a detail of such a tray. The cross ribs also confers rigidity to the structure, e.g to the level required for automated handling.

The bottom of the cell preferably has an open structure with supporting ribs and openings, for draining and lump ejection purposes.

What is claimed is:

1. A tray of cells for the cultivation of seedlings, said tray comprising:

a plurality of cells, each of said plurality of cells having side walls and a plurality of apertures therein for inducing air pruning of roots, at least some of said apertures extending to an upper edge of said cell and breaking the upper edge thereof;

a plurality of channels disposed between said plurality of cells to allow for a vertical flow of air, at least some of said apertures in said side walls opening into said channels, wherein at least a part of said channels between said cells is divided by structural elements for preventing root growth from one of said plurality of cells to another of said plurality of cells, said structural elements being ribs having a cross-formed horizontal section.

\* \* \* \* \*